United States Patent
Troyanker et al.

(10) Patent No.: US 9,107,164 B1
(45) Date of Patent: Aug. 11, 2015

(54) WAKE ON ONE-TO-MANY COMMUNICATION

(71) Applicant: Amazon Technologies, Inc., Reno, NV (US)

(72) Inventors: Vlad Troyanker, San Jose, CA (US); Welly Kasten, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 13/791,598

(22) Filed: Mar. 8, 2013

(51) Int. Cl.
*H04L 12/26* (2006.01)
*H04W 52/02* (2009.01)
*H04W 40/20* (2009.01)
*H04W 64/00* (2009.01)
*H04W 4/02* (2009.01)

(52) U.S. Cl.
CPC ............ *H04W 52/0229* (2013.01); *H04W 4/02* (2013.01); *H04W 40/20* (2013.01); *H04W 64/006* (2013.01)

(58) Field of Classification Search
CPC ........ H04L 12/26; H04W 4/02; H04W 40/20; H04W 64/006; H04W 52/0229
USPC ................................................... 370/311, 338
See application file for complete search history.

(56) References Cited

U.S. PATENT DOCUMENTS

| | | | |
|---|---|---|---|
| 2006/0173781 A1* | 8/2006 | Donner | 705/50 |
| 2011/0317600 A1* | 12/2011 | Thomson et al. | 370/311 |
| 2014/0149758 A1* | 5/2014 | Rajkotia | 713/310 |

* cited by examiner

*Primary Examiner* — Sai-Ming Chan
(74) *Attorney, Agent, or Firm* — Lee & Hayes, PLLC

(57) ABSTRACT

A network device may include first and second processors and a wireless transceiver under control of the second processor. The network device may further maintain one or more signatures and a wake-up module executable by the second processor. The wake up module may receive a multicast wireless communication while the first processor is in a low-power sleep mode. The wake up module may determine whether a data portion of the multicast wireless communication includes a signature. If the data portion of the wireless communication includes the signature, the wake up module may cause the first processor to leave the low-power sleep mode and process the multicast wireless communication.

36 Claims, 8 Drawing Sheets

WAKE ON ONE-TO-MANY COMMUNICATION

BACKGROUND

Computing devices have become commonplace in almost every environment. For example, mobile telephones, laptop computers, and tablet computers are commonly used for work and pleasure, and accompany people in many daily activities. Further, people often travel with computers and mobile phones, bring these devices to school, and use these devices in public places. These electronic devices wirelessly communicate with a communications infrastructure to enable the consumption of digital media items, such as documents, images, music, and videos.

Some computing devices, for example battery-powered devices, include functions that allow the device to enter a low-power or sleep mode in which many of the components of the device are powered down or in a reduced power state (e.g. an application processor of the device). Other components remain "awake" and may wake up the sleeping components based on some trigger. For example, the networking component may trigger the wake up of the device when a communication is received that is addressed to the sleeping device. However, this conventional wake up functionality does not allow for operation with, for example, multicast communication. In some cases, the inability to wake on multicast may interfere with functionality of a network. As such, there is a need for techniques and systems that allow for waking a device on one-to-many communication without overly increasing power consumption.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
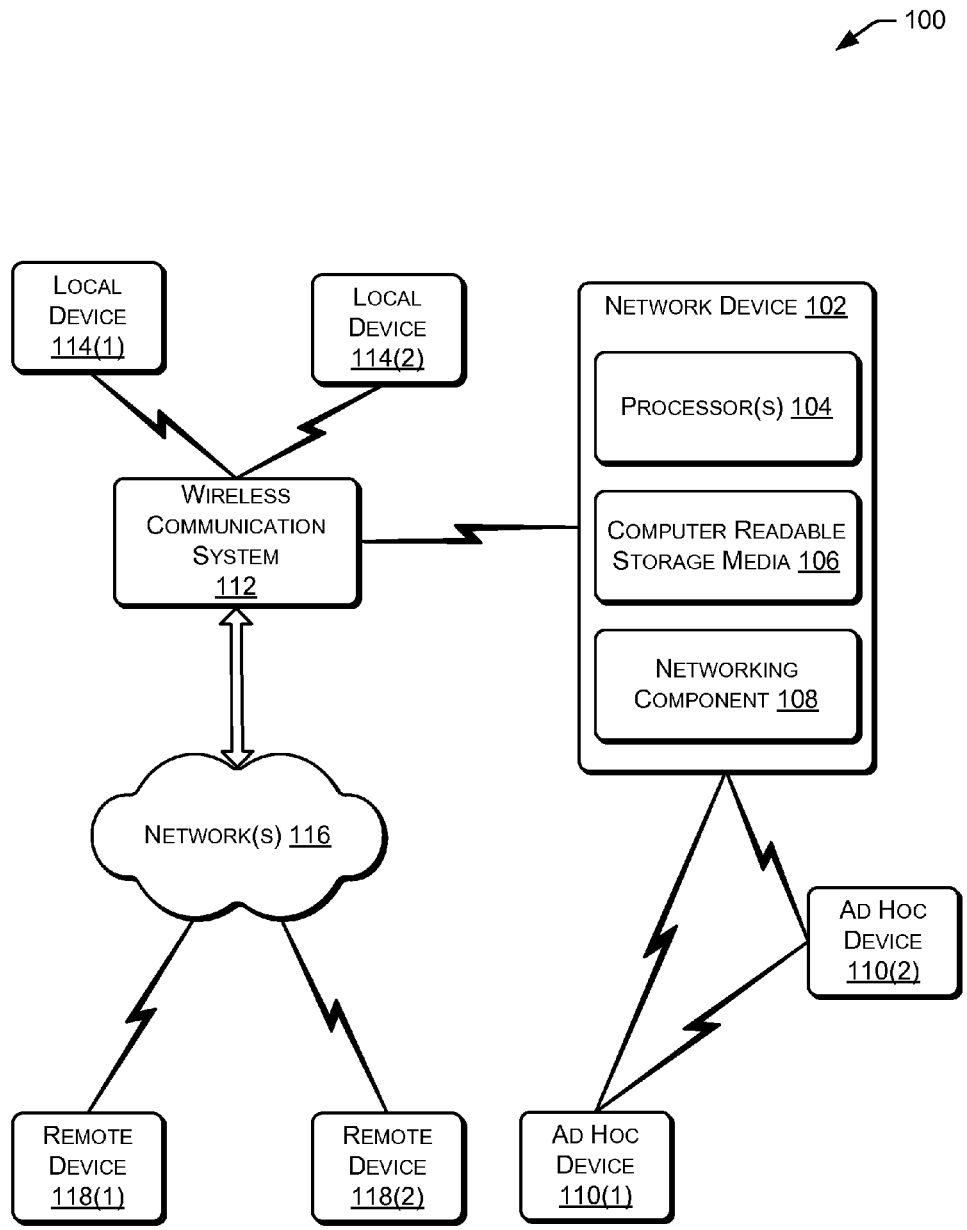
FIGS. 1-3 illustrate a schematic diagram of an example computing architecture in which multicast discovery requests may cause a network device in a low-power sleep mode to wake up.

Network devices may be capable of transmitting data using one or more networking components, such as a Wi-Fi transceiver, mobile telephone communication transceiver, Bluetooth® transceiver, or other wireless protocol transceivers, transmitters, and/or receivers. Communications exchanges between the network devices may involve multicast communications. Moreover, in some communication networks (e.g. peer-to-peer networks), multicast communications may be utilized for establishing a domain name system (DNS) for the network. For example, when a new device joins a peer-to-peer local area network, the new device may transmit a multicast discovery request that is directed to all devices in the local area network. These multicast discovery requests may be utilized in some implementations to discover the other devices in the network and the services offered by those other devices, such as multicast DNS (mDNS) and DNS-Service Discovery (DNS-SD).

Multicast is a type of one-to-many routing protocol. Multicast may use network infrastructure efficiently by requiring the source to send a packet only once, even if it needs to be delivered to a large number of receivers. The nodes in the network take care of replicating the packet to reach multiple receivers when necessary. More particularly, copies may be automatically created in other network elements, such as routers, but only when the topology of the network requires it, for example, at a branching of the network topology in which two or more branches are to receive the packet.

For the ease of discussion, this disclosure uses the term "multicast" in much of the description. However, the use of multicast in the description is merely an example for ease of illustration and should not be taken as limiting the disclosed techniques and systems to multicast systems alone. Rather, the disclosed systems and techniques may be utilized with regard to other one-to-many communication routing protocols, such as broadcast, anycast, etc. For example, the systems and techniques disclosed herein may provide, in some implementations, a wake on broadcast functionality without causing unacceptable power consumption. Additionally, the disclosed systems and techniques may, in some implementations, be utilized with regard to unicast or other routing protocols that are not one-to-many protocols.

As mentioned above, some network devices may include a sleep or low-power mode functionality. In some sleep or low-power modes, some components of a device, such as a main or application processor, are maintained in the low-power (sleep) mode while other components, such as a networking component, remain awake and are responsible for waking up the sleeping components as necessary. For example, in some implementations, these other components may cause the sleeping components to move from a low-power mode to an awake or normal-power mode upon a triggering event. In the awake or normal-power mode, the components may operate at a standard or normal power level and may process requests normally.

In the case of mobile or battery-powered devices, the power management architecture of the operating system may be based on keeping the device in the sleep mode as much of the time as possible. Problems may arise in systems that generally allow multicast communications (e.g. multicast discovery requests) to wake sleeping devices. In the case of multicast discovery requests to discover services (e.g., DNS-SD), the amount of discovery communication traffic exchanged across a particular network grows proportionally to the size of the network (e.g., the number of endpoint devices include in the network). As such, allowing multicast communication in general to wake sleeping devices may result in frequent wake ups and, in the case of battery-powered devices, drain battery power at an unacceptable rate. In short, this may undermine the goal of the power management architecture, particularly in mobile devices.

In view of the power management architecture considerations mentioned above, multicast/broadcast communications are typically prevented from waking sleeping devices. As such, there arises a problem in handling low-power devices in communication systems that rely on multicast/broadcast communications, for example, in systems utilizing multicast/broadcast communications for service discovery (e.g. DNS-SD). In a particular example, a device in a sleep mode may receive a multicast discovery request communication from another device that is attempting to discover devices that offer a particular service. In the above-described operations, the networking component of the sleeping device may discard the multicast packets even though the sleeping device may offer the service that is the subject of the multicast discovery request. Thus, the services offered by the sleeping device may not be discovered.

Some implementations of the present disclosure may facilitate a wake on one-to-many communication (multicast, broadcast, anycast, etc.) functionality without causing unacceptable power consumption (referred to hereinafter as wake on multicast). Such wake on multicast functionality may be performed by selectively waking the device based on information included in a data portion of incoming multicast communications. In some implementations, the information included in the data portion that is examined may be a signature identifying a particular protocol or service that has been selected to be allowed to wake device. Example implementations will be discussed below.

Illustrative Environment and Network Device

FIG. 1 is a schematic diagram of an illustrative computing architecture 100. The computing architecture 100 may include a network device 102 that includes one or more processor(s) 104, at least one computer readable storage media 106, and a networking component 108. The network device 102 is illustrated using the networking component 108 to communicate in several different scenarios. In the first scenario, the network device 102 may utilize the networking component 108 to perform ad hoc communication with an ad hoc device 110(1) and an ad hoc device 110(2) (such as in a peer-to-peer and/or ad hoc network). In a second scenario, the network device 102 may utilize the networking component 108 to communicate via a wireless communication system 112 with a local device 114(1) and a local device 114(2). In some implementations, the communication with the local device 114(1) and the local device 114(2) may be conducted utilizing the wireless communications system 112 in a wireless local area network. In a third scenario, the networking device 102 may utilize the networking component 108 to communicate via the wireless communication system 112 and one or more network(s) 116 (e.g., public network such as the Internet and/or remote private networks such as a local area network (LAN)) with a remote device 118(1) and a remote device 118(2). In some implementations, the communication with the remote device 118(1) and the remote device 118(2) may be conducted utilizing the wireless communication system 112 in conjunction with a wide area network.

The network device 102 may be variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The network device 102 may include any type of content rendering devices such as electronic book (eBook) reader devices, portable digital assistants, mobile phones, laptop computers, portable media players, tablet computers, cameras, video cameras, netbooks, notebooks, desktop computers, gaming devices or consoles, DVD players, media centers, and any other device equipped with a networking component (e.g. a wireless transceiver). The ad hoc devices 110, local devices 114 and remote devices 118 may be similar to the network device 102 or may be different types of devices.

The network device 102, ad hoc devices 110, local devices 114 and remote devices 118 deliver and/or receive items, upgrades, and/or other information via the network 116 and wireless communication system 112. For example, the network device 102 may download or receive items from one or more of the ad hoc devices 110, local devices 114 and remote devices 118. The wireless communication system 112 also receives various requests, instructions and other data from the network device 102, ad hoc devices 110, local devices 114 and remote devices 118. The wireless communication system 112 and network 116 may include one or more machines (e.g., one or more server computer systems, routers, gateways, etc.) that have processing and storage capabilities to provide the above functionality.

Though examples are provided above, communication between the network device 102, ad hoc devices 110, local devices 114 and remote devices 118 may be enabled via any communication infrastructure. One example of such an infrastructure, and one which may be illustrated by FIG. 1, includes a combination of a wide area network (WAN) and wireless infrastructure, which allows a user to use the network device 102 to communicate with local and remote devices without being tethered to the another device or system via hardwired links. The wireless infrastructure may be provided by one or multiple wireless communications systems, such as the wireless communication system 112 and/or additional wireless communication system(s). The wireless communication systems 112 may be a wireless fidelity (Wi-Fi) hotspot of a local area network to which network device 102 and local devices 114 are connected. In some implementations, the wireless communication systems 112 may be a wireless carrier system that can be implemented using various data processing equipment, communication towers, etc. Alternatively, or in addition, the wireless carrier system may rely on satellite technology to exchange information with the network device 102.

As mentioned above, in addition to wirelessly connecting to the wireless communication system 112, the network device 102 may also wirelessly connect with other devices (e.g., ad hoc devices 110). For example, the network device 102 may form a wireless ad hoc and/or peer-to-peer) network with the ad hoc devices 110.

Figure 2:
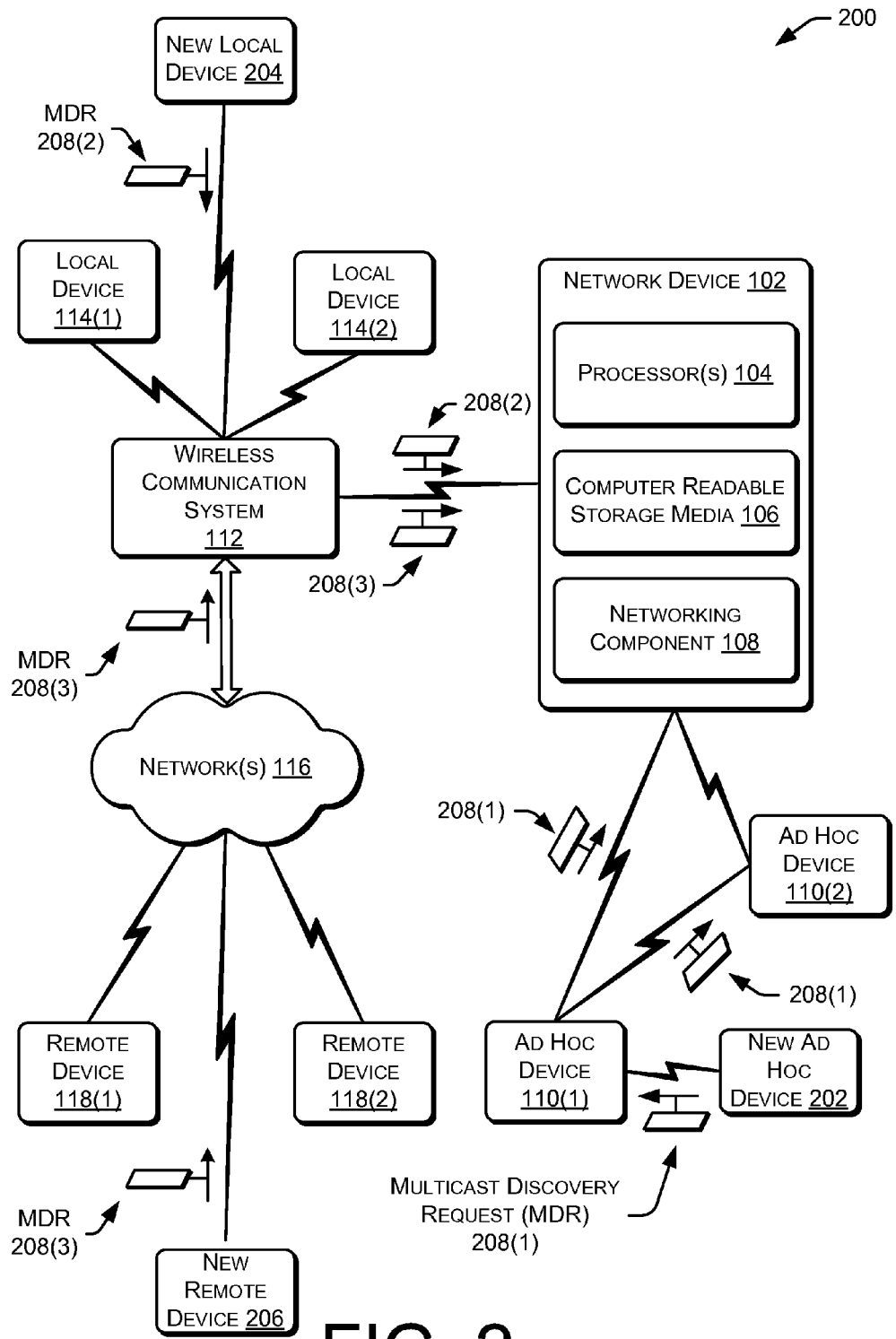

FIG. 2 is a schematic diagram of an illustrative computing architecture 200, which may correspond to the computing architecture 100 of FIG. 1 following the addition a new ad hoc device 202, a new local device 204 and a new remote device 206. More particularly, the new ad hoc device 202 is illustrated as joining the ad hoc communication by connecting to the ad hoc device 110(1), the new local device 204 is illustrated as joining communication by connecting to the wireless communication system 112, and the new remote device 206 is illustrated joining by connecting via the network(s) 116.

In the networking scenarios illustrated in FIG. 2, multicast communications may be utilized in the manner discussed above to discover the other devices and/or the services offered by those devices. As illustrated FIG. 2, the new ad hoc device 202, the new local device 204 and the new remote device 206 send out multicast discovery requests (MDR) 208(1), 208(2) and 208(3), respectively. As the MDR 208 are multicast requests, the requests are copied at each receiving device as necessary based on the branching of the network. This propagation is illustrated with respect to MDR 208(1). Specifically, the ad hoc device 110(1) receives the MDR 208(1) from the new ad hoc device 202 and sends a copy of the MDR 208(1) to the devices on its outgoing branches, i.e. ad hoc device 110(2) an network device 102. Though not shown, the network device 102 and the ad hoc device 110(2) may each forward another copy of MDR 208(1) to one another. The propagation of the multicast communications may be based on a network domain. As such, in some implementations, the network device 102 may not forward a copy of MDR 208(1) to the wireless communication system 112 for additional propagation outside of the ad hoc network. However, in other implementations, MDRs may propagate based on additional or other factors.

The MDR 208(2) and the MDR 208(3) may be propagated in a similar manner to the illustrated propagation of the MDR 208(1). FIG. 2 includes the propagation of the MDR 208(2) and the MDR 208(3) to the network device 102 via the wireless communication system 112 and, for MDR 208(3), the network(s) 116. However, for ease of illustration, FIG. 2 does not show the propagation to the other devices such as the local device 114(1), local device 114(2), remote device 118(1) and the remote device 118(2).

Figure 3:
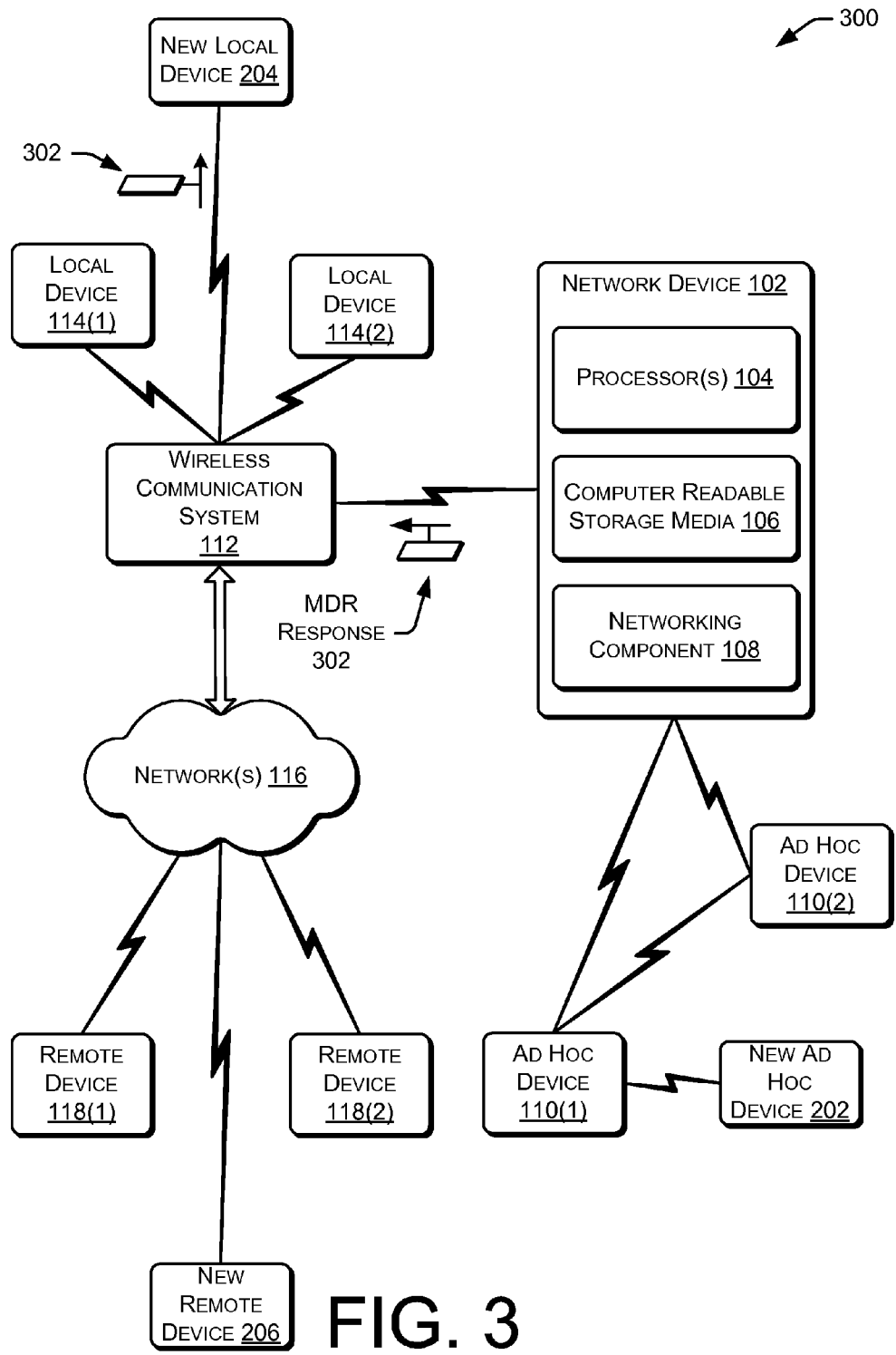

FIG. 3 is a schematic diagram of an illustrative computing architecture 300, which may correspond to the computing architecture 100 of FIG. 1 after the network device 102 receives a multicast discovery request. In particular, FIG. 3 illustrates the network device 102 replying to the MDR 208 (2) from the new local device 204 with an multicast discovery request (MDR) response 302 via wireless communication system 112.

In some implementations, the handling of multicast discovery requests 208 by the network device 102 may vary based at least in part on the state of the network device 102 upon receipt of an MDR 208. For example, if the network device 102 is in an awake state or normal power mode, the processing of the MDR may proceed normally, e.g. the network device 102 returns a response to the MDR with the requested information. Depending on the details of a given implementation, the response 302 to the MDR may vary. In some implementations, the response 302 may be a unicast communication directed specifically to the requester corresponding to the MDR. In other implementations, the response 302 to the MDR may be a multicast communication directed to more than one device, including device from which the MDR was received (e.g. the domain, network, subnet, etc. from which the MDR was received).

The content of an MDR response 302 may be based on a variety of factors, such as the details of a given implementation, the type of multicast discovery request, the source of the multicast discovery request, a protocol or service associated with the multicast discovery request, etc.

The determination of whether to wake up the network device 102 may be made by a wake-up module 304 of the networking component 102. In particular, the wake-up module 304 determines whether the received MDR 208 is allowed to trigger a wake-up of the network device 102 and cause the network device 102 to process the MDR 208. For example, in some implementations, multicast discovery requests directed toward discovery of one or more specified services may be allowed to cause the wake-up of the network device 102 upon receipt of the multicast discovery requests. In some implementations that utilize multicast discovery requests (e.g. DNS-SD), when a first device wishes to discover other second devices in the network which provide a particular service, the first device may issue a multicast discovery request packet. In some implementations, the multicast discovery request functionality may be provided using IP multicast over User Datagram Protocol (UDP). In such implementations, the multicast discovery request packet may include at least two portions, a header portion and a data portion. In some conventional systems, a device that is in a sleep mode may only analyze the IP header to determine, for example, if the packet is a multicast or a unicast packet and discard the packet if it is a multicast packet. In a more particular example, some conventional systems provide support for waking devices only when the destination address in the IP header is that of the device in question.

In some implementations of the disclosed systems and techniques, a network device 102 in sleep mode that receives a multicast discovery request packet may perform a determination to determine if the device should be woken. This determination may be performed by a wake-up module 304 of the networking component 108. Example operations of some implementations of the wake-up module 304 upon receipt of a packet while the network device 102 is in a sleep mode are discussed below.

In a first step, the wake-up module 304 determines if the packet is a unicast packet or a multicast packet. If the packet is a unicast packet, the wake-up module 304 determines if the network device 102 corresponds to the destination address identified in the header of the packet. If so, the wake-up module 304 wakes the network device 102.

If the packet is a multicast packet, the wake-up module 304 may parse the data portion of the packet to determine if the multicast packet is of a type that may be allowed to trigger the wake up of the network device 102. In some implementations, which types of multicast packets may be allowed to the wake the network device 102 may be predefined. The features of the multicast packets allowed to wake the network device 102 may vary depending on the implementation and may be defined in the software, firmware, hardware, or etc. of the network device 102. Moreover, the determination of whether the multicast packet is allowed to wake the network device 102 may be a single test or a sequence of tests at increasing levels of detail. An example of a sequence of tests of whether or not to wake the network device 102 is discussed below with respect to a system in which UDP multicast discovery requests (e.g. DNS-SD requests) for discovering hosts providing a first service of one or more services.

In a first determination, the wake-up module 304 may determine if the received multicast packet is a UDP multicast discovery request. If not, the multicast packet may be discarded without waking the network device 102. If the multicast packet is a UDP multicast discovery request, the wake-up module 304 may parse the data portion of the multicast packets and determine if the data portion includes a signature or identifying feature of any service identified as being able to wake the network device 102 by multicast communication, i.e., the first service. In some implementations, the signature may be a service type (PTR) field of the data portion of the multicast discovery request. In such implementations, when the requesting device wants to discover network devices that offer the first service, the requesting device sets a service type (PTR) field of the data portion of the multicast discovery request to a PTR of the first service. If the signature of the first service (i.e. the PTR of the first service) is present in the data portion of the multicast packet, the wake-up module 304 initiates a wake-up procedure to the processor 104 of the network device 102. Of course, more than one service type may be identified as being able to trigger the wake up of the network device 102 by multicast communication. Thus, if a signature, such as the service type (PTR) field is present, and is signature of a second service that is also allowed to wake the network device 102 on a multicast communication, the waking of the network device 102 is triggered. If the signature of the second service is not identified as allowed to wake the network device on multicast or if no identified signatures present, the multicast packet is discarded. Of course, the service type (PTR) field discussed above is merely an example of a signature that may be used in some implementations. In other implementations, the signature may take various forms, such as a bit pattern that may be detected in the data portion of the multicast communication.

Variations on the above described determination of whether to wake the network device should be understood to be included within the scope of this disclosure. For example, in some implementations, the determinations of whether to wake a network device may be implemented as a series of "filters." More particularly, in some implementations, a network packet that is received while a device is in a sleep mode may be subjected to a series of filters prior to being discarded. If the network packet matches a filter in the series of filters, the networking component wakes the network device. Thus, in such example implementations, a network packet received while the device is in sleep mode may be checked by a first filter to determine if it is addressed to the sleeping network device. If so, the device is awoken. Otherwise, the packet is subjected to the next filter. At a second filter, a determination may be made as to whether the packet corresponds to a multicast service discovery request for a particular service. In some implementations, the second filter operates to parse the packet to locate a field, such as the PTR record, and to determine if the located field (e.g. PTR record) corresponds to the particular service allowed to wake up the network device. If so, the device is awoken. In other implementations, the second folder may operate to scan the packet or a portion of the packet (e.g. the data portion of the packet) to determine if a bit sequence corresponding to the PTR record (or any other signature of the particular service) is present in the packet or the scanned portion thereof. If the bit pattern is located, the device is awoken. If the packet fails each filter in the series of filters, the wake up module may discard the packet and the network device remains in the sleep mode.

It should be understood that the above operations are merely examples and that many variations are within the scope of this disclosure. Further, additional details and variations are provided below. Additionally, while the discussion above is directed to wireless communication, the wake on multicast techniques and systems discussed here may apply to other communication systems, i.e. wired communication systems such as Ethernet communication systems.

Figure 4:
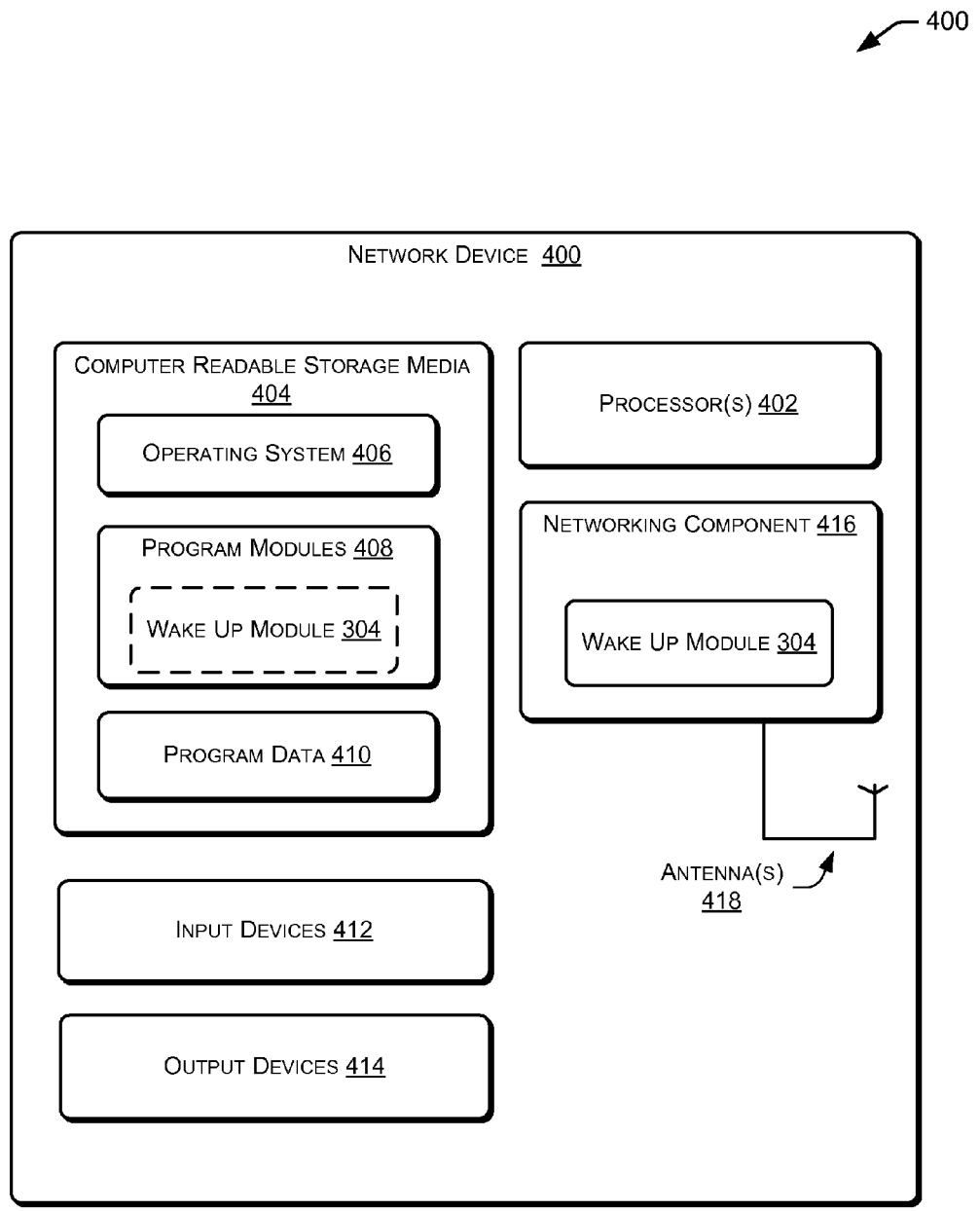
FIG. 4 is a block diagram of an illustrative network device.

FIG. 4 is a block diagram illustrating an exemplary user device 400. The network device 400 may correspond to the network device 102 of FIGS. 1-3 and may be any type of computing device such as an electronic book reader, a PDA, a mobile phone, a laptop computer, a portable media player, a tablet computer, a camera, a video camera, a netbook, a desktop computer, a gaming device or console, a DVD player, a media center, and any other device that includes a networking component (e.g. a wireless transceiver).

The network device 400 includes one or more processor(s) 402, such as one or more CPUs, microcontrollers, field programmable gate arrays, or other types of processors. The network device 400 also includes computer-readable media 404, which may correspond to any combination of volatile and/or non-volatile storage mechanisms. The computer-readable media 404 stores information which provides an operating system component 406, various program modules 408 such as wake up module 304, program data 410, and/or other components. The network device 400 performs functions by using the processor(s) 402 to execute instructions provided by the computer-readable media 404. Depending on the configuration of the network device 400, the computer-readable media 404 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, and/or any other medium that can be used to store information and which can be accessed by the processor(s) 402 directly or through another computing device. Accordingly, the computer-readable media 404 may be computer-readable storage media able to maintain instructions, modules or components that are executable by the processor(s) 402. Instructions for the wake up module 304 may reside, completely or at least partially, within the computer-readable media 404 and/or within the processor(s) 402 during execution thereof by the network device 400, the computer-readable media 404 and the processor(s) 402 also constituting computer-readable storage media.

The network device 400 may also include one or more input devices 412 (keyboard, mouse device, specialized selection keys, etc.) and one or more output devices 414 (displays, printers, audio output mechanisms, etc.).

The network device 400 further includes a networking component 416 illustrated herein in the context of a wireless transceiver that allows the network device 400 to communicate via a wireless network (e.g., such as that provided by a wireless communication system) with other computing devices. The networking component 416 may correspond to the networking component 108. The networking component 416 may allow the network device 400 to handle both voice and non-voice communications (such as communications for text messages, multimedia messages, media downloads, web browsing, etc.) within a wireless communication system. The networking component 416 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiMAX, Long Term Evolution (LTE), fourth generation wireless (4G), Wi-Fi, etc. In one implementation, the networking component includes the wake up module 304 in addition to, or instead of, the wake up module 304 being included in the computer-readable media 404 and/or processor(s) 402. The wake up module 304 may be implemented as hardware, firmware and/or software of the networking component 416.

The networking component 416 may generate signals, after which they are wirelessly transmitted via the antenna(s) 418. Though not required, if multiple antennas 418 are included, the antenna(s) 418 may be configured to transmit in different frequency bands and/or using different wireless communication protocols. The antenna(s) 418 may be directional, omnidirectional or non-directional antennas. In addition to sending data, the antenna(s) 418 also receive data, which is sent to networking component 416 and transferred to processor(s) 402.

Although a single networking component 416 is shown to control transmission to antenna(s) 418, the network device

400 may alternatively include multiple networking components, each of which is configured to transmit data via a different antenna and/or wireless transmission protocol. In one implementation, each networking component includes an independent wake up module 304. Alternatively, a single wake up module 304 (e.g., that included in networking component 416) may perform the functions of the wake up module 304 with respect to each networking component.

Figure 5:
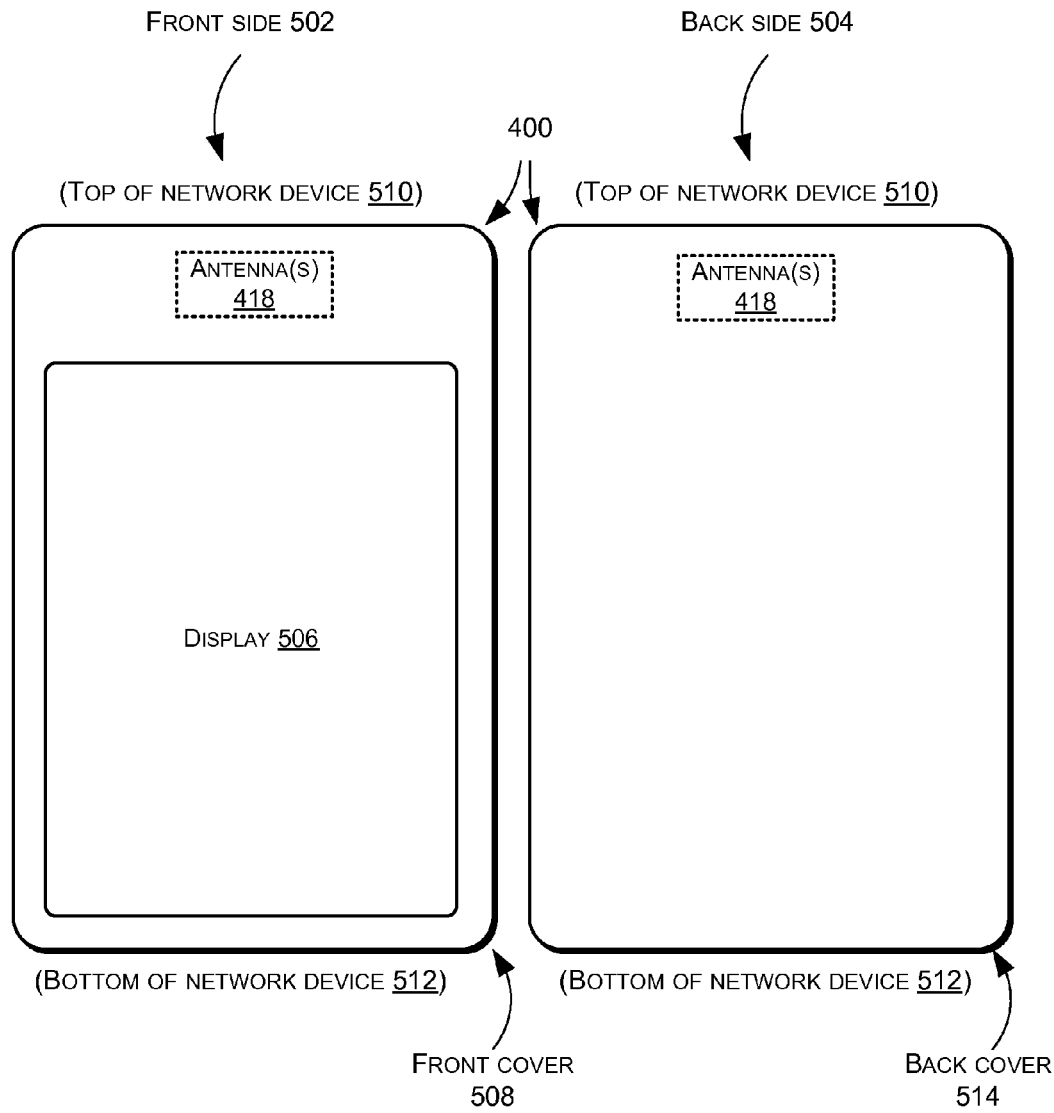
FIG. 5 is a schematic diagram of a front side and a back side of the illustrative network device.

FIG. 5 is a schematic diagram of a front side 502 and a back side 504 of the network device 400. The front side 502 includes a display 506. The display 506 may use any available display technology, such as electronic ink (e-ink), liquid crystal display (LCD), transflective LCD, light emitting diodes (LED), laser phosphor displays (LSP), and so forth. In some implementation, the display 506 and an input are combined into one or more touch screens. Optionally, the user device may include an input housed in a front cover 508. The input may include a keyboard, touch pad, or other input mechanism.

Disposed inside the network device 400 is an antenna 418. As shown, the antenna 418 is positioned near a top 510 of the networking device 400. However, the antenna 418 may also be positioned at other locations, such as at a side of the network device 400 or near the bottom 512 of the network device 400.

The antenna(s) 418 are shown in the illustrated implementation using dashed lines to indicate that these components are not on a surface of the network device 400 (e.g., that they are inside a back cover 514). However, in alternative implementations these components may be on a surface of the network device 400.

Illustrative Process

Figure 6:
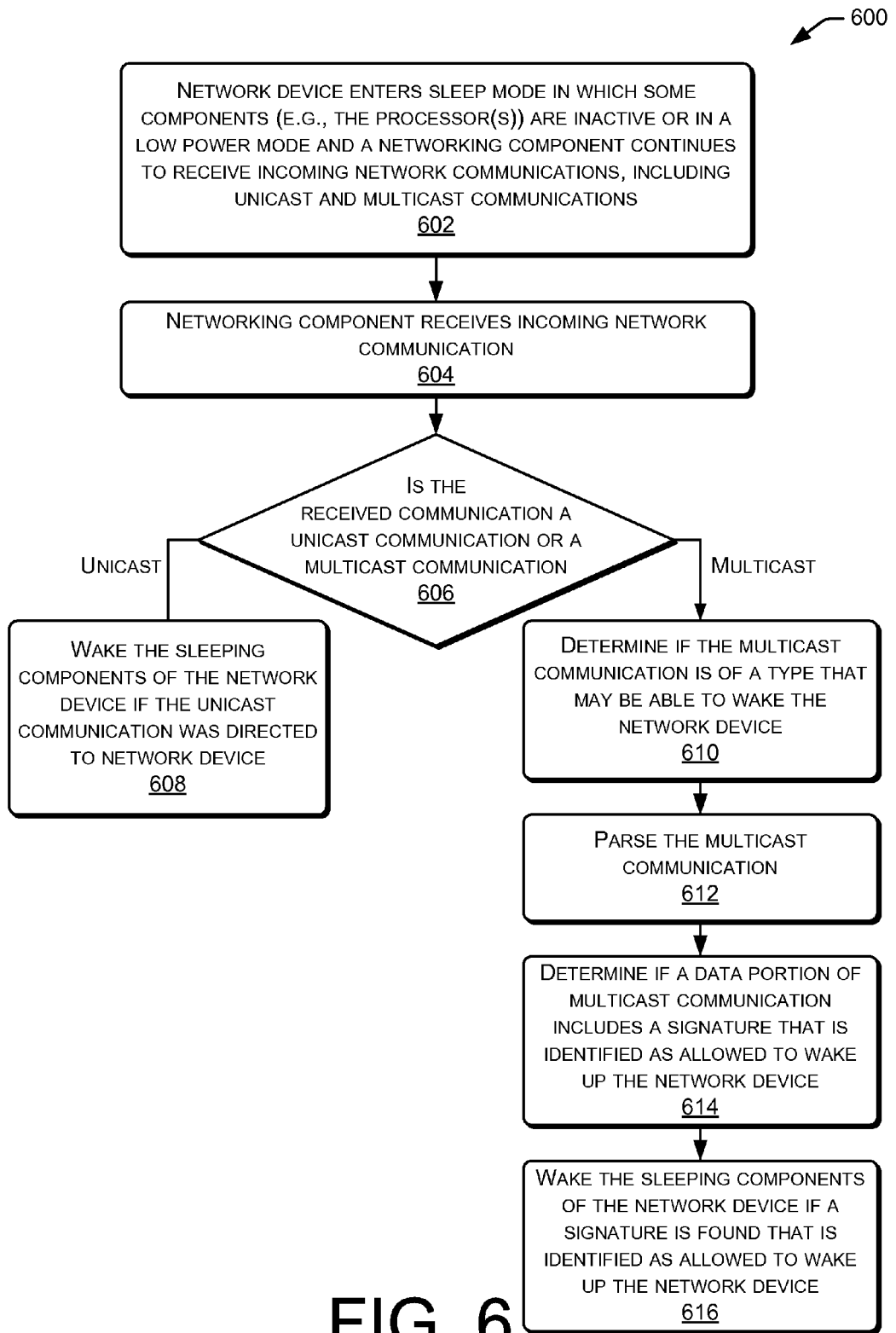
FIG. 6 is a flow diagram of an illustrative process for providing wake on multicast functionality.

FIG. 6 is a flow diagram of an illustrative process 600 that shows an example operation of a wake up module of the networking component. The process 600 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure (e.g. FIG. 7), in addition to process 600, shall be interpreted accordingly.

The process 600 is described with reference to FIGS. 1-5 and may be performed by the network devices 102 and 400. Of course, the process 600 (and other processes described herein) may be performed in other similar and/or different devices and/or in different environments. Further, in the particular implementation shown in FIG. 6 and described below, the wake up determination process includes determining a type of multicast communication, parsing multicast communications and other operations that may or may not be included in other implementations.

At 602, the network device 102 enters a sleep mode in which some components of the network device, including the processor(s) 104, are inactive or operating in a low-power, reduced activity mode. In the sleep mode, the networking component 108 continues to be able to receive incoming network communications, including unicast and multicast communications.

At 604, the networking component 108 receives an incoming network communication. The receipt of the incoming network communication initiates the wake up determination procedure by the wake-up module 304

At 606, the wake-up module 304 determines if the received network communication is a unicast communication or a multicast communication. If it is determined that the communication is a unicast communication, the process flow continues to 608. Otherwise, if the communication is determined to be a multicast communication, the process continues to 610.

At 608, the wake up module 304 determines if the unicast communication was directed to the network device 102. For example, the wake-up module 304 may determine if the destination address included in the header of the unicast communication is an address of the network device 102. If the unicast communication was directed to the network device 102, the wake-up module 304 may cause the networking component 108 to initiate a wake-up of the network device 102 (i.e. the components of the network device 102 in the inactive or operating in a low-power, reduced activity mode). Otherwise, the unicast communication is discarded.

At 610, the wake-up module 304 determines if the multicast communication is of a type that may be able to wake the network device. If the multicast communication is of a type that is able to wake the network device, the process continues to 612. Otherwise, the process ends and the multicast communication is discarded.

The types of multicast communications may be divided based on a variety of factors. The types of multicast communications may be divided based on the protocols or combinations of protocols used in different layers (e.g. a combination of two or more of the internet layer protocol, the transport layer protocol, and the application layer protocol, etc.). Some example protocols in the internet layer that may involve multicast communication include Internet Protocol Version 4 (IPv4), Internet Protocol Version 6 (IPv6), Internet Control Message Protocol (ICMP), Internet Group Management Protocol (IGMP). Some example protocols in the transport layer that may involve multicast communication include User Datagram Protocol (UDP), Pragmatic General Multicast (PGM), and Protocol Independent Multicast (PIM). Some example protocols in the application layer that may involve multicast communication include Multicast DNS (mDNS), DNS Service Discovery (DNS-SD), Link-local Multicast Name Resolution (LLMNR), Domain Name System (DNS), Internet Relay Chat (IRC) and Web Services Dynamic Discovery (WS-Discovery).

Accordingly, the wake-up module 304 may include a preselected or dynamically updated list of types of multicast communication that may be allowed to wake up the device. Based on the above examples of protocols of different layers, some examples of types of multicast communications that may be allowed to wake up the device could include mDNS requests over UDP/IP and DNS-SD requests over UDP/IP. Other combinations of the above example protocols, as well as any number of other protocols, could be allowed to wake the network device 102 on multicast depending on the details of the implementation.

At 612, the multicast communication is parsed. For example, assuming that the multicast communication is determined to be a DNS-SD request over UDP, the data portion of the communication may be parsed by the wake-up module 304 of the networking component 108 (e.g. the data portion of a packet corresponding the DNS-SD request is parsed).

At 614, the wake-up module 304 determines if the data portion of the multicast communication includes a signature that is identified as allowed to wake up the network device 102. For example, the data portion of a DNS-SD request includes a PTR record that identifies the services which the DNS-SD request attempting to locate. Using DNS-SD requests as an example, the wake-up module 304 may include a preselected or dynamically updatable list of service identifiers that, if included in the PTR record of a DNS-SD request, are allowed to wake up to the network device 102.

If the data portion of the multicast communication includes a signature identified as being allowed to wake up the network device 102, the process continues to 616. Otherwise, the process is terminated and the multicast communications discarded.

At 616, in response the determination that a signature was found in the data portion of the multicast communication which is identified as allowed to wake up the network device 102, the wake-up module 304 may cause the networking component 108 to initiate a wake-up of the network device 102 (i.e. wake up those components of the network device 102 that are in the inactive or operating in a low-power, reduced activity mode).

Figure 7:
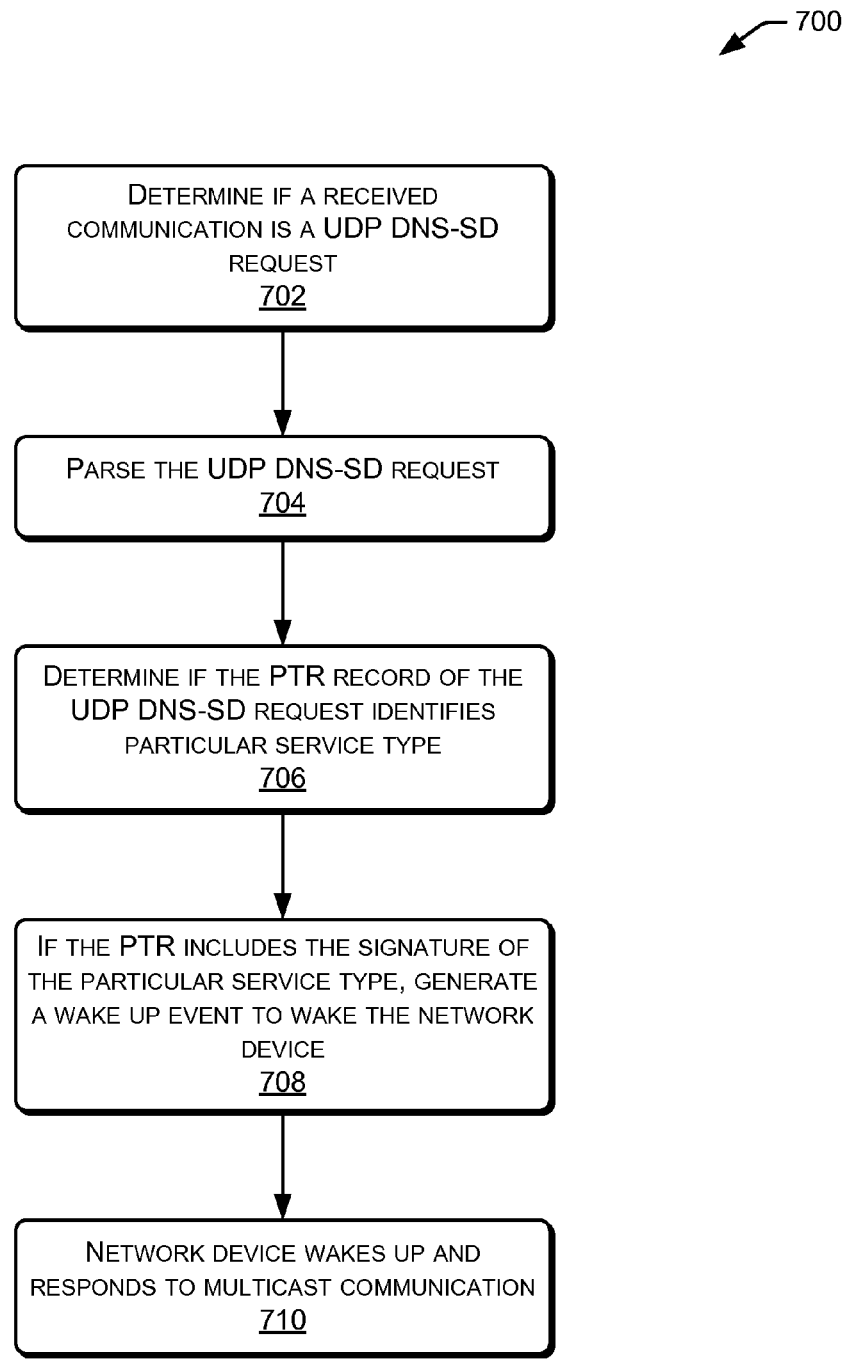
FIG. 7 is a flow diagram of an illustrative process for providing another implementation of the wake on multicast functionality.
Figure 8:
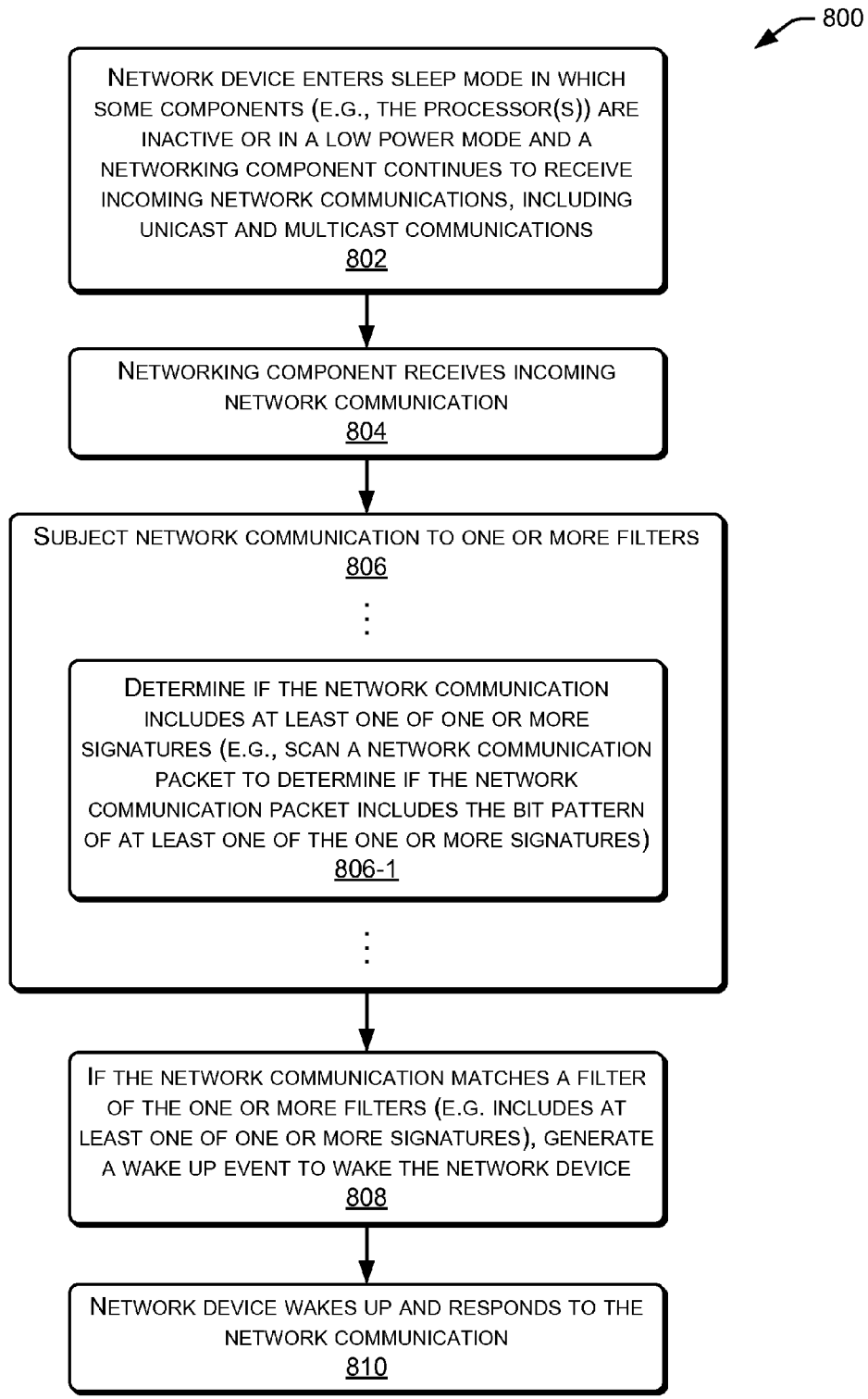
FIG. 8 is a flow diagram of an illustrative process for providing another implementation of the wake on multicast functionality.

The process flow illustrated in FIG. 6 is an example and should not be taken as limiting. Other variations will be apparent to one of ordinary skill in the art in view of this disclosure. For example, unlike the example process flow illustrated in FIG. 6. some implementations may be specifically directed to particular services rather than configurable using lists of protocols and PTRs. One such variation is illustrated in FIG. 7. Another variation that utilizes a series of filters including a filter that scans a received packet to ascertain if the packet includes a bit pattern (i.e. signature) rather than parsing the data portion is illustrated in FIG. 8.

FIG. 7 is a flow diagram of an illustrative process 700 that shows another example of the operation of a wake up module 304 of the networking component 108. As mentioned above, the process 700 illustrated in FIG. 7 is a variation of the process illustrated in FIG. 6. In particular, the process 700 is specifically directed to 1) DNS-SD requests over UDP/IP and 2) a specific service type (PTR).

At 702, the wake-up module 304 determines if a received communication is a UDP/IP DNS-SD request. This may be done by, for example, analyzing the header information of the received communication packets. When a UDP/IP DNS-SD request is identified, the process moves to 704.

At 704, the wake-up module 304 parses the UDP/IP DNS-SD request. In some implementations, the wake-up module 304 may parse the data portion or body of the UDP/IP DNS-SD request. In some such implementations, the wake-up module 304 may parse the UDP/IP DNS-SD request and extract the service type (PTR) record from the data portion of the packet.

At 706, the wake-up module 304 determines if the PTR record of the UDP/IP DNS-SD request identifies a particular service type specified as being allowed to wake up the network device 102. While the implementation shown in FIG. 7 is directed to the PTR record of a UDP/IP DNS-SD request, implementations of the disclosed systems and techniques are not so limited. The particular fields analyzed to determine a "signature" for the particular service may vary based on the implementation, what protocols are used, and other factors as would be understood by one of ordinary skill in the art in view of this disclosure.

At 708, if the PTR record is determined to include a signature of the particular service type that is allowed to wake the network device 102, the wake-up module 304 may generate a wake up event to wake up the other components of the network device 102. Although discussed with regard to FIG. 7 as a wake up event, other types of intra-device communication may be utilized to trigger the wake up of the network device 102.

At 710, the network device 102 wakes up (i.e. the components operating in the low-power mode return to an awake mode). The network device 102 then processes the DNS-SD request and, if appropriate, responds to the request.

FIG. 8 is a flow diagram of an illustrative process 800 that shows another example of the operation of a wake up module 304 of the networking component 108. As mentioned above, the process 800 illustrated in FIG. 8 is a variation of the process illustrated in FIG. 6. In particular, the process 800 is directed to an implementation in which the wake-up determination is implemented as a series of filters where the network device is awoken when a received network communication matches a filter of the series of filters.

At 802, the network device 102 enters a sleep mode in which some components of the network device, including the processor(s) 104, are inactive or operating in a low-power, reduced activity mode. In the sleep mode, the networking component 108 continues to be able to receive incoming network communications, including unicast and multicast communications.

At 804, the networking component 108 receives an incoming network communication. The receipt of the incoming network communication initiates the wake up determination procedure by the wake-up module 304.

At 806, the network communication is subjected to one or more filters. As mentioned above, packets that match a filter are allowed to wake up the network device 102. In the example implementation illustrated in FIG. 8, one filter 806-1 is shown for ease of illustration and understanding. However, any number of filters 806-1 to 806-N may be included. In some implementations including a plurality of filters, once a network communication is matched to a filter of the series of filters, the process may continue to 808 without completing additional/subsequent filters in the series of filters.

At 806-1, the wake-up module 304 determines if the network communication includes at least one of one or more signatures. In some example implementations, this determination may be performed by scanning the network communication packet to determine if the network communication packet includes a bit pattern of at least one of one or more signatures identified as being allowed to wake up the network device 102. Referring back to the previous examples, such as signature may be a service identifier (e.g. PTR record) or other type of signature that should be able to wake up the network device 102. If a signature is found, the process may continue to 808. If the filter represented by 806-1 is the last filter in the series of filters and the network communication does not match the filter represented by 806-1, the packet may be discarded and process 800 is complete.

At 808, if the network communication matched a filter the series of filters, the wake-up module 304 may generate a wake up event to wake up the other components of the network device 102. As mentioned above with regard to FIG. 7, though discussed herein as a wake up event, other types of intra-device communication may be utilized to trigger the wake up of the network device 102.

At 810, the network device 102 wakes up (i.e. the components operating in the low-power mode return to an awake or normal power mode). The network device 102 then processes the network communication that woke the device and, if appropriate, responds to the network communication.

Implementations such as that illustrated in FIG. 7 may be desirable when a specific service type over a specific protocol is to be allowed to wake the network device 102 on multicast. By not referring to the list of protocols and/or services, the process 700 may achieve better performance than the process 600. On the other hand, process 700 may have disadvantages in implementations in which more than one service type or combination of protocols should be allowed to wake on multicast. Depending on the details of a given implementation, the approaches represented by FIGS. 6-8 may hybridized to varying degrees. For example, in some implementations, the approach presented by FIG. 7 may be altered such that the process is specifically directed to DNS-SD requests over UDP but a list of service types, or service signatures, is used in determining whether a DNS-SD request is allowed to wake the device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A network device, comprising:
   a first processor;
   a second processor;
   a wireless transceiver under control of the second processor and configured to communicate wirelessly with another device;
   one or more computer-readable media maintaining one or more signatures and a wake-up module executable by the second processor to:
      receive a multicast wireless communication while the first processor is in a low-power sleep mode, the multicast wireless communication comprising a header portion and a data portion;
      determine the multicast wireless communication is a service discovery request and the data portion of the multicast wireless communication includes one of one or more signatures; and
      cause the first processor to leave the low-power sleep mode and process the multicast wireless communication in response to determining the multicast wireless communication is a service discovery request and the data portion of the multicast wireless communication includes one of the one or more signatures.

2. The network device as recited in claim 1, the wake up module further executable to:
   receive a unicast wireless communication while the first processor is in a low-power sleep mode;
   determine whether the unicast wireless communication is addressed to the network device; and
   cause the first processor to leave the low-power sleep mode and process the unicast wireless communication in response to determining the unicast wireless communication is addressed to the network device.

3. The network device as recited in claim 1, wherein the wireless communication is a peer to peer communication.

4. The network device as recited in claim 1, wherein the processing of the multicast communication by the first processor includes sending a response to the service discovery request.

5. The network device as recited in claim 1, further comprising at least one battery that powers the first processor, the second processor, the wireless transceiver, and the one or more computer readable media.

6. A networking component comprising:
   a processor;
   a wireless transceiver under control of the processor and to communicate wirelessly with another device;
   one or more computer-readable media maintaining a signature and a wake-up module executable by the processor to:
      determine a one to many communication is a service discovery communication and includes the signature, the communication comprising a header portion and a data portion; and
      cause an application processor of a device to leave a low-power mode and process the one to many communication in response to determining the one to many communication is a service discovery communication and includes the signature.

7. The networking component as recited in claim 6, wherein the one to many communication is a multicast service discovery request.

8. The networking component as recited in claim 6, wherein the signature is a service type (PTR) record.

9. The networking component as recited in claim 6, wherein the signature is a bit pattern.

10. The networking component as recited in claim 6, wherein the signature is associated with a service type identified as allowed to cause a wake up of the device.

11. The networking component as recited in claim 10, wherein the wake up module is further executable to:
   discard a multicast communication without causing the application processor to leave the low-power mode in response to a determination that the multicast communication does not includes the signature identified as allowed to wake the first processor.

12. The networking component as recited in claim 6, wherein the one to many communication is an IP (Internet Protocol) multicast communication.

13. The networking component as recited in claim 6, wherein the one to many communication is a DNS-SD (Domain Name System-Service Discovery) request.

14. The networking component as recited in claim 6, wherein the signature is one of a plurality of signatures maintained by the computer readable media and the signatures are associated with the plurality of service types allowed to wake up the application processor.

15. The networking component as recited in claim 6, wherein the networking component is a component of the device.

16. The networking component as recited in claim 6, the wake up module being further executable to determine the communication is a multicast communication.

17. A method comprising:
   under control of a processor configured with executable instructions,
      determining a one to many communication is a one to many service discovery communication and includes a signature of a service type; and
      causing an application processor of a device to leave a low-power mode such that application processor of the device enters a normal power mode and processes the one to many wireless communication in response to determining the one to many communication is a one to many service discovery communication and includes the signature.

18. The method as recited in claim 17, wherein the service type is identified as allowed to cause a wake up of the device.

19. The method as recited in claim 18, further comprising: discarding the one to many communication without causing the application processor to leave the low-power mode in response to a determination that the one to many communication does not includes the signature identified as allowed to wake the device.

20. The method as recited in claim 17, wherein the one to many communication is a multicast service discovery request.

21. The method as recited in claim 17, wherein the signature is a bit pattern located in a service type (PTR) record of the one to many communication.

22. The method as recited in claim 17, wherein the one to many communication is an IP multicast communication.

23. The method as recited in claim 17, wherein the one to many communication is a DNS-SD request.

24. The method as recited in claim 17, wherein the one to many communication is a communication of a one-to-many routing protocol.

25. The method as recited in claim 17, wherein the processor is included in a networking component comprising the processor and a wireless transceiver.

26. The method as recited in claim 17, wherein the determining whether the one to many communication includes the signature includes scanning the wireless communication to find a bit pattern of the signature.

27. The method as recited in claim 17, wherein the signature is not a network address.

28. The method as recited in claim 17, wherein the signature is not a network address associated with the processor.

29. A method comprising:
under control of a processor configured with executable instructions,
scanning a network communication data packet to determine if the network communication data packet is a one to many service discovery communication and includes a signature; and
causing at least one component of a device to leave a low-power mode such that the at least one component of the device enters a normal power mode and processes the network communication data packet in response to determining the network communication data packet is a one to many service discovery communication and includes the signature.

30. The method as recited in claim 29, wherein the signature is identified as allowed to cause a wake up of the device.

31. The method as recited in claim 30, further comprising: discarding the network communication data packet without causing the at least one component to leave the low-power mode, in response to a determination that the network communication data packet does not includes the signature identified as allowed to wake the device.

32. The method as recited in claim 29, wherein the network communication data packet is a multicast service discovery request packet.

33. The method as recited in claim 29, wherein the signature is a bit pattern corresponding to a service type (PTR) record.

34. The method as recited in claim 29, wherein the network communication data packet is a DNS-SD request packet.

35. The method as recited in claim 29, wherein the network communication data packet is a communication packet of a one-to-many routing protocol.

36. The method as recited in claim 29, wherein the processor is included in a networking component comprising the processor and a wireless transceiver.

* * * * *